3,708,516
3-BUTENE-3-CYANO-1,2-DICARBOXYLIC ACID ESTERS
Ken-Ichi Morita and Tsuneo Kobayashi, Kamakura, Japan, assignors to Toray Industries, Inc., Tokyo, Japan
No Drawing. Original application Mar. 31, 1970, Ser. No. 627,289, now Patent No. 3,538,147, dated Nov. 3, 1970. Divided and this application June 24, 1970, Ser. No. 49,529
Int. Cl. C07c *121/48, 121/60, 121/40*
U.S. Cl. 260—464                                    7 Claims

ABSTRACT OF THE DISCLOSURE

Compounds having the following formula:

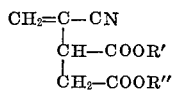

wherein R' and R" are the same or different and represent an alkyl group having up to 18 carbon atoms, an alkenyl group having up to 18 carbon atoms, an aryl group having up to 10 carbon atoms, an aralkyl group having up to 10 carbon atoms or a cycloalkyl group having 10 carbon atoms.

---

This is a division of our co-pending application Ser. No. 627,289, filed Mar. 31, 1970, now U.S. Pat. No. 3,538,147, issued Nov. 3, 1970.

This invention relates to 3-butene-3-cyano-1,2-dicarboxylic acid esters.

It has been found that novel butene polycarboxylic acid esters can be manufactured by reacting acrylonitrile with an ethylene dicarboxylic acid ester selected from the group consisting of maleic acid esters and fumaric acid esters in the presence of an organic tertiary phosphorus (III) compound selected from the group consisting of tertiary phosphines and tertiary phosphoamides.

The novel compounds of this invention have the following formula:

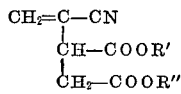

wherein R' and R" are the same or different and represent an alkyl group having up to 18 carbon atoms, an alkenyl group having up to 18 carbon atoms, an aryl group having up to 10 carbon atoms, an aralkyl group having up to 10 carbon atoms; or a cycloalkyl group having up to 10 carbon atoms.

It is a primary object of this invention to provide novel 3-butene-3-cyano-1,2-dicarboxylic acid esters.

It is a further object of this invention to provide compounds which are useful as starting materials in polymerization reactions.

Other objects and advantages of the compounds of this invention will become more apparent form the following more detailed description thereof.

Specific examples of the novel 3-butene-3-cyano-1,2-dicarboxylic acid esters of this invention include the following compounds:

1,2-dimethoxycarbonyl-3-cyano butene-3
1,2-diethoxycarbonyl-3-cyano butene-3
1,2-di-n-butoxycarbonyl-3-cyano butene-3
1,2-dicyclohexylcarbonyl-3-cyano butene-3
1,2-dioctyloxycarbonyl-3-cyano butene-3
1,2-diphenoxycarbonyl-3-cyano butene-3, etc.

The novel 3 - butene - 3 - cyano - 1,2 - dicarboxylic acid esters of the present invention can be utilized as starting materials for the production of polymers. In particular, by copolymerizing the compounds of this invention with a monomer, such as styrene, acrylonitrile, acrylic acid, acrylic esters, methacrylic acid, methacrylic esters and vinyl acetate, the impact strength and adhesive property of the resultant copolymer are improved. When the compounds of this invention are converted to their acid anhydrides, they are useful as curing agents for epoxy resins and the like. The tendency for easy decarbonization of these compounds also makes them useful as blowing agents.

The novel 3 - butene - 3 - cyano - 1,2 - dicarboxylic acid esters of this invention can be produced by reacting acrylonitrile with a maleic acid ester of the formula:

 (II)

(wherein R' and R" have the meaning as already defined above) or a fumaric acid ester of the formula:

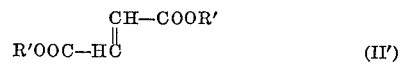 (II')

(wherein R' and R" have the meaning as already defined above) in the presence of a catalytic amount of an organic tertiary phosphorus (III) compound selected from the group consisting of tertiary phosphines and tertiary phosphoamides.

The maleic acid esters and fumaric acid esters to be reacted with the acrylonitrile include the following:

The dialkyl maleates or fumarates such as dimethyl, diethyl, dipropyl, dibutyl, dipentyl, diheptyl, dioctyl, dinonyl, didecyl, didodecyl, diheptadecyl, dioctadecyl, methyl ethyl, methyl butyl, and ethyl butyl maleate or fumarate; the dialkenyl maleates or fumarates such as divinyl, diallyl, diisopropenyl maleates or fumarates; diaryl maleates or fumarates such as diphenyl, ditolyl, di(p-methoxyphenyl), di-(p-chlorophenyl), phenyltolyl, and phenyl-p-chlorophenyl maleates or fumarates; and diaralkyl mealates or fumarates such as dibenzyl, diphenylethyl, and benzyl phenylethyl maleates or fumarates; the dicycloalkyl maleates or fumarates such as dicyclopentyl, dicyclohexyl and cyclopentyl-cyclohexyl maleates or fumarates, etc.

The organic tertiary phosphorus (III) compound used as the catalyst is selected from the group consisting of tertiary phosphines and tertiary phosphoamides which have the following formula:

 (IV)

(wherein $R_4$, $R_5$ and $R_6$ are the same or different and represent an alkyl group having up to 8 carbon atoms, which alkyl group may have a cyano, carbonyl, hydroxy, hydroxycarbonyl or alkoxycarbonyl group having up to 9 carbon atoms substituted thereon; a cycloalkyl group having 5 to 8 carbon atoms, an aryl, preferably phenyl; any two of $R_4$, $R_5$ and $R_6$ may form a hetero ring together with the phosphorus atom,

wherein $R_7$ and $R_8$ are the same or different and represent an alkyl group having up to 8 carbon atoms, a cycloalkyl group having 5 or 6 carbon atoms, an aryl group, preferably a phenyl group, or $R_7$ and $R_8$ together represent an alkylene or oxyalkylene having 4 or 5 carbon atoms or

wherein $R_9$ and $R_{10}$ are the same or different and represent an alkyl group having 5 or 6 carbon atoms or an aryl group, preferably a phenyl group.

Examples of the tertiary phosphines useful as catalysts for producing the novel compounds of this invention are: trialkyl phosphines such as trimethyl, triethyl, tripropyl, triisobutyl, tributyl, trihexyl and trioctylphosphine; tricycloalkyl phosphines such as tricyclopentyl, tricyclohexyl and cyclopentyl dicyclohexyl phosphine; triarylphosphines such as triphenyl phosphine; alkyl diaryl or dialkyl aryl phosphines such as isobutyl diphenyl, diisobutyl phenyl, 4-hydroxy butyl diphenyl and phenyl diethylphosphine; alkyl dicycloalkyl or dialkyl cycloalkyl phosphines such as ethyl dicyclohexyl, diethyl cyclohexyl, butyl dicyclohexyl, dibutyl cyclohexyl, dicyclohexyl-2-cyanoethyl, cyclohexyl-di-(2-cyanoethyl), dicyclohexyl-2-methoxycarbonylethyl, cyclohexyl - di(2 - hydroxycarbonyl) and dicyclohexyl - 2 - butyroyl phosphine; and tertiary phosphines such as compounds having the following formulae:

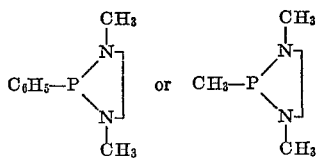

Examples of the tertiary phosphoamides are tris (dialkylamino) phosphines such as tris (dimethylamino), tris (diethylamino), tris (diisopropylamino), tris (dibutylamino) and tris (diisobutylamino) phosphine, tris (dicycloalkylamino) phosphines such as tris (dicyclopentylamino), tris (dicyclohexylamino) phosphine and the like, tris (diarylamino) phosphines such as tris (diphenylamino), a tris (ditoylyamino) and tris (di-p-chlorophenylamino) phosphoamide, tertiary phosphoamides wherein $R_7$ and $R_8$ together form an alkylene or oxyalkylene group having 4 or 5 carbon atoms such as trimorpholino, tripiperidino and tripyrrolidino phosphine, tertiary phosphoamides having different substituents such as tris (N-methyl-N-phenylamino), tris (N-methyl-N-ethylamino), tris (N-ethyl-N-cyclohexylamino), tris (N-phenyl-N-cyclohexylamino), methyl dimorpholino, ethyl dimorpholino, cyclo hexyl dipyrrolidino, phenyl dipyrrolidino and diphenyl morpholino phosphine; and tertiary phosphines wherein $R_4$, $R_5$, and $R_6$ are

such as tetracyclohexyl diphosphine, tetradiisobutyl phosphine, tetradibutyl phosphine and butyl tricyclohexyl phosphine.

Also suitable as catalysts in the process of the invention are catalysts wherein the tertiary phosphine moiety is contained within a metal complex, such as a modified metal carbonyl complex of a transition metal.

Especially preferable among the above-mentioned organic tertiary phosphorus (III) compounds are tertiary phosphines wherein a secondary carbon atom is linked with a phosphorus atom, such as tertiary phosphine having a cycloalkyl group such as tricyclopentyl phosphine, tricyclohexyl phosphine, tricycloheptyl phosphine, tris (methylcyclohexyl) phosphine, tricyclooctyl phosphine, trinorbornyl phosphine, diethyl cyclohexyl phosphine, ethyl di-cyclohexyl phosphine, diethyl cyclohexyl phosphine and dibutyl cyclohexyl phosphine and tertiary phosphoamides wherein $R_7$ and $R_8$ have 3 to 8 carbon atoms such as tris (dialkylamino) phosphine such as tris (di-n-butylamino) phosphine and tris (di-isobutylamino) phosphine.

In this invention, the amount of ethylene dicarboxylic acid ester can be determined according to the amount used in an ordinary stoichiometrical reaction, and is in general 0.1 to 5 mole equivalents, preferably 0.3 to 1.5 mole equivalents, based on the acrylonitrile.

The reaction of this invention proceeds in the presence of the organic tertiary phosphorus (III) compound in a catalytic amount or in an amount of 0.001 to 0.1 mole equivalent based on the acrylonitrile but does not proceed in its absence. The amount can be increased optionally.

The reaction temperature is ordinarily 0 to 200° C., and preferably 30 to 120° C.

A polymerization inhibitor such as tert.-butylpryocatechol and pyrohydroquinone may also be added to the reaction system.

It is also preferable that the atmosphere of the reaction system should be non-oxidizing.

The use of an inert solvent is not necessary, but the following solvents can be used with good results. Ethers such as dimethyl and diethyl ether, dioxane, tetrahydrofuran, alcohols such as ethyl, isopropyl, tert.-butyl alcohol, sec.-butyl, sec.-amyl, tert.-amyl, octyl and decyl alcohol, aromatic hydrocarbons such as benzene, toluene and xylene, and compounds with a nitrogen-containing organic base such as dimethyl formamide, pyridine, triethyl amine and trimethyl amine.

When the reaction of this invention has sufficiently proceeded, the organic tertiary phosphorus (III) compound may be inactivated by addition to the reaction system of a catalyst-inactivating agent such as adipic acid and p-toluenesulfonic acid.

The method of this invention also includes an embodiment wherein 3-butene-3-cyano-1,2-dicarboxylic acid ester can be converted into 3-butene-1,2,3-tricarboxylic acid by heating in an acid or alkali aqueous solution for hydrolysis.

3-butene-polycarboxylic acid ester can be converted into 3-butene- polycarboxylic acid ester having other ester groups by heating in an alcohol in the presence of an ester-interchange catalyst such as sulfuric acid. 3-butene tricarboxylic acid or its esters can be converted into 3-butene polycarboxylic acid or its esters by reduction with hydrogen gas in the presence of a reducing catalyst such as nickel and palladium. These 3-butenetricarboxylic acids or their esters find wide applications as plasticizers, enamels for electric wires and water-soluble paints. If 3-butene-1,2,3-tricarboxylic acid is heated to about 200° C., it can be converted into dimethylmaleic anhydride.

The following examples illustrate the preferred embodiments of the novel compounds of this invention only and should not be taken as limiting.

EXAMPLE 1

Trimorpholinophosphine (0.3 g.) was added to a solution of 10 ml. of dioxane, 3.5 g. of acrylonitrile and 11 g. of diethyl fumarate in a nitrogen atmosphere, and the mixture was heated for 16 hours at 90° C. The solvent and the unreacted starting materials were then removed by distillation. High vacuum distillation yielded 10.2 g. of 3-cyanobutene-1, 2-dicarboxylic acid, dimethyl ester.

EXAMPLE 2

Tripyrrodinylphosphine (0.2 g.) was added to a solution of 10 ml. of dioxane, 2.7 g. of acrylonitrile and 8 g. of diethyl maleate, and the mixture was heated for 15 hours at 90° C. with stirring. The reaction product mixture was distilled according to the procedure of Example 1 and yielded 7.2 g. of 3-cyano-butene-1,2-dicarboxylic acid, dimethyl ester.

EXAMPLE 3

A solution of 25 ml. of dioxane, 5.8 g. of acrylonitrile, 14.4 g. of dimethyl fumarate and 0.8 g. of tris (dimethylamino) phosphine was heated for 15 hours at 85° C. The reaction product mixture was treated according to the procedure of Example 1 and yielded 13.8 g. of 3-cyanobutene-1,2-dicarboxylic acid, dimethyl ester.

EXAMPLE 4

A solution of 15 ml. of dioxane, 7.5 g. of acrylonitrile, 17.5 g. of diethyl fumarate and 0.5 g. of methyldimorpholino phosphine was heated for 20 hours at 85° C. The reaction product mixture was treated according to the procedure of Example 1 and yielded 15.8 g. of 3-cyanobutene-1,2-dicarboxylic acid, diethyl ester.

EXAMPLE 5

A solution of 10 ml. of dioxane, 3.3 g. of acrylonitrile, 8.6 g. of diethyl maleate and 1.5 g. of diphenylmorpholino phosphine was heated for 20 hours at 100° C. The reaction product mixture was treated according to the procedure of Example 1 and yielded 6.2 g. of 3-cyanobutene-1,2-dicarboxylic acid, diethyl ester.

EXAMPLE 6

A solution of 50 ml. of dioxane, 5.4 g. of acrylonitrile, 17.2 g. of diethyl fumarate and 0.65 g. of tricyclohexyl phosphine was heated for 15 hours at 100° C. The reaction product mixture was treated according to the procedure of Example 1 and yielded 18.1 g. of 3-cyanobutene-1,2-dicarboxylic acid, diethyl ester.

EXAMPLE 7

A solution of 30 ml. of dioxane, 2.7 g. of acrylonitrile, 8 g. of diethyl fumarate and 0.3 g. of tricyclohexyl phosphine was heated for 20 hours at 100° C. The reaction product mixture was treated according to the procedure of Example 1 and yielded 7.5 g. of 3-cyanobutene-1,2-dicarboxylic acid, diethyl ester.

EXAMPLE 8

A solution of 50 ml. of dioxane, 5.8 g. of acrylonitrile, 14.4 g. of dimethyl fumarate and 0.73 g. of tricyclohexyl phosphine was heated for 20 hours at 100° C. The reaction product mixture was treated according to the procedure of Example 1 and yielded 13.5 g. of 3-cyanobutene-1,2-dicarboxylic acid, dimethyl ester.

EXAMPLE 9

1.0 g. of diethylphenyl phosphine was added to a mixture of 7.5 g. of acrylonitrile and 17.2 g. of diethyl fumarate and the mixture was heated for 20 hours at 100° C. The reaction product mixture was treated according to the procedure of Example 1 and yielded 12.6 g. of 3-cyanobutene-1,2-dicarboxlic acid, diethyl ester.

EXAMPLE 10

A solution of 40 ml. of dioxane, 6.5 g. of acrylonitrile, 17.2 g. of diethyl maleate and 0.9 g. of dicyclohexyl butyl phosphine was heated for 15 hours at from 90° to 100° C. The reaction product mixture was treated according to the procedure of Example 1 and yielded 16.5 g. of 3-cyanobutene-1,2-dicarboxylic acid, diethyl ester.

What is claimed is:

1. A 3-butene-3-cyano-1,2-dicarboxylic acid ester of the formula:

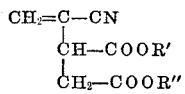

wherein R' and R'' are the same or different hydrocarbon groups and are selected from the group consisting of an alkyl group having up to 18 carbon atoms, an aryl group having up to 10 carbon atoms, an aralkyl group having up to 10 carbon atoms, a cyclopentyl group and a cyclohexyl group.

2. A butene polycarboxylic acid ester according to claim 1 wherein said ester is 1,2-dimethoxycarbonyl 3-cyano butene-3.

3. A butene polycarboxylic acid ester according to claim 1 wherein said ester is 1,2-diethoxycarbonyl 3-cyano butene-3.

4. A butene polycarboxylic acid ester according to claim 1 wherein said ester is 1,2-di-n-butoxycarbonyl 3-cyano butene-3.

5. A butene polycarboxylic acid ester according to claim 1 wherein said ester is 1,2-di-cyclohexyloxycarbonyl 3-cyano butene-3.

6. A butene polycarboxylic acid ester according to claim 1 wherein said ester is 1,2-di-octyloxycarbonyl 3-cyano butene-3.

7. A butene polycarboxylic acid ester according to claim 1 wherein said ester is 1,2-diphenoxycarbonyl 3-cyano butene-3.

References Cited

UNITED STATES PATENTS 3,318,944  5/1967  Wiley _____ 260—465.4 X
3,499,024  3/1970  Morita et al. _____ 260—464 X JOSEPH P. BRUST, Primary Examiner U.S. Cl. X.R.

260—78.5 B, 78.5 E, 78.5 HC, 346.8, 465 D, 465.4, 485, 537